June 27, 1939.  R. Q. KIRKPATRICK  2,164,246
SOD CUTTER
Filed Jan. 3, 1938
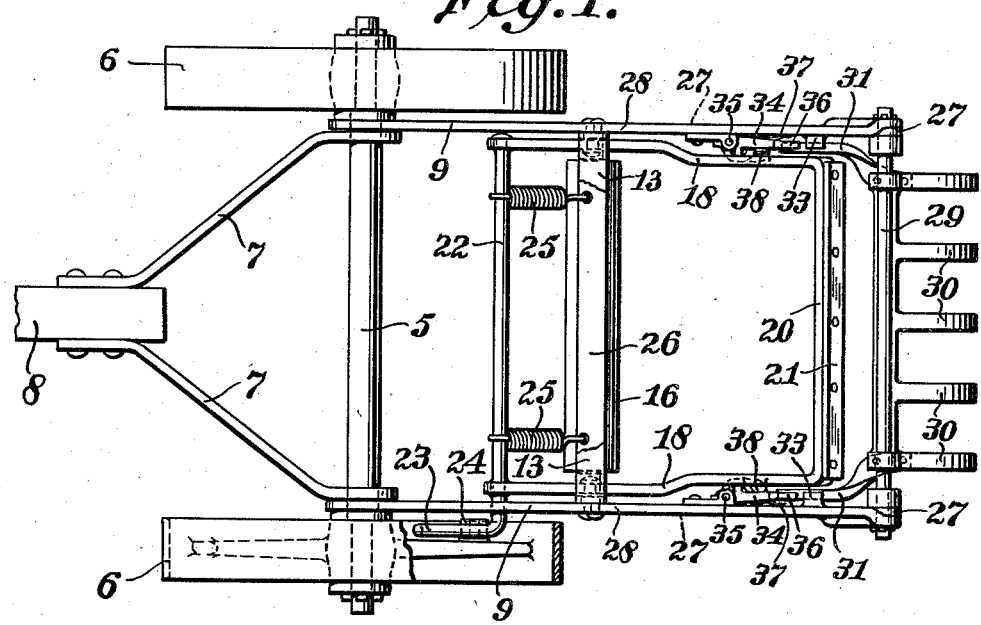
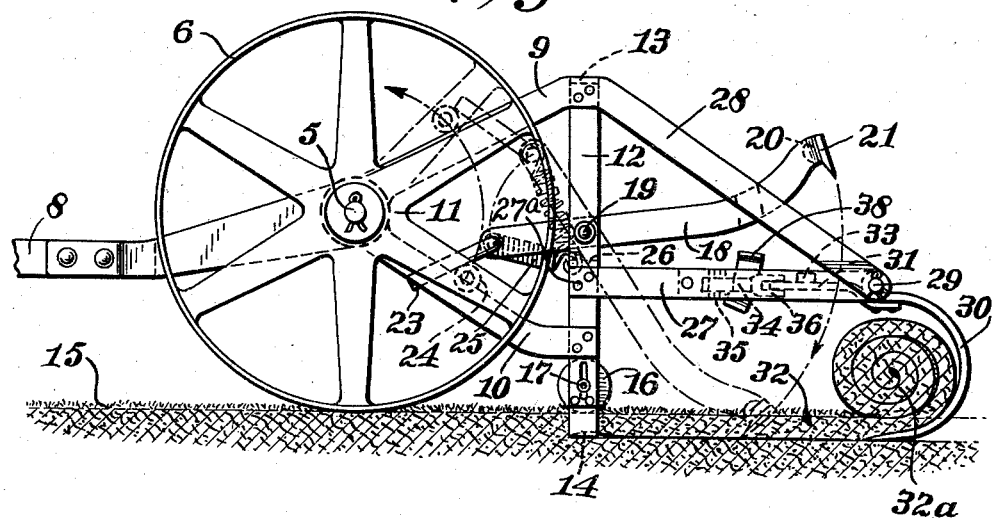
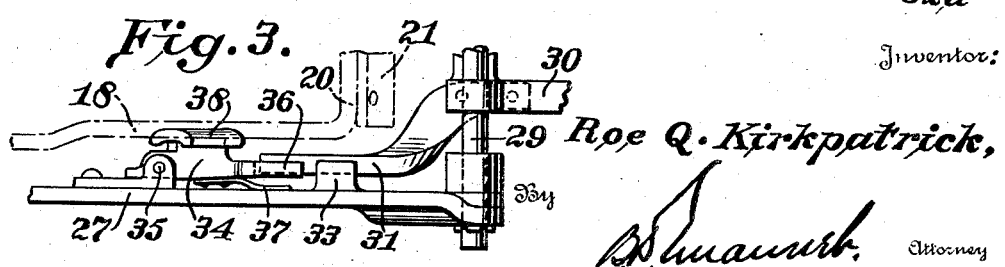
Inventor:
Roe Q. Kirkpatrick,
By
Attorney

Patented June 27, 1939

2,164,246

UNITED STATES PATENT OFFICE 2,164,246

SOD CUTTER

Roe Q. Kirkpatrick, Anderson, Ind.

Application January 3, 1938, Serial No. 183,215

10 Claims. (Cl. 97—226)

This invention relates to certain new and useful improvements in sod cutters.

The primary object of the invention is to provide a sod cutting machine constructed and arranged for the cutting of sod in strip form with devices for regulating the thickness of the sod strip, cutting the strip into predetermined lengths, and for moving the cut strip into roll formation, the machine being entirely automatic in all of its operations and driven in any desired manner, such as by attachment to a tractor plow or the like.

With the above and other objects in view that will become apparent as the nature of the invention is better understood, the same consists of the novel construction, combination and arrangement of parts to be hereinafter more fully described and then claimed.

In the accompanying drawing which shows a preferred embodiment of the present invention:

Figure 1 is a top plan view, partly broken away and shown in section of the sod cutting machine constructed in accordance with the present invention, Figure 2 is a side elevational view showing the machine in operation, the ground line being illustrated in section and showing the sod cut in strip form, the rolling device for the sod strip and the knife for severing the cut strip into the desired length, the latter being illustrated by broken lines in its sod strip severing position, and Figure 3 is a fragmentary top plan view of the latch devices for controlling the operation and release of the sod strip rolling member.

The sod cutting machine comprises a wheeled frame or carriage having an axle 5 carrying a ground wheel 6 at each end, the axle being journaled through the rear ends of forwardly converging arms 7 that are attached at their forward ends to a draft bar 8. A frame structure supported on the axle 5 and extending rearwardly thereof comprises, as shown in Figure 2, a pair of V-shaped members having bars 9 and 10 respectively extending upwardly and downwardly with a member located adjacent each end of the axle 5 with the connected ends 11 supported on the axle 5.

A vertically disposed rectangular frame including side bars 12 has the rear ends of the side bars 9 and 10 secured thereto adjacent the upper and lower ends thereof, the rectangular frame having the top cross bar 13 constituting a brace and a lower cross bar 14 constituting a cutter blade. The cutter blade 14 normally occupies a position in a plane below the ground wheels 6 and the depth of entry of the cutter blade 14 into the grass plot or ground 15 is regulated by a roller 16 adjustably mounted at each end thereof as at 17 in the lower ends of the side bars 12 of the rectangular frame.

The cutter blade 14 cuts the sod in strip formation and the strip is cut into lengths by a cutter device supported on the rectangular frame and controlled in its operation by the ground wheel 6. The sod strip severing device is of rectangular form in plan view as shown in Figure 1 and includes a pair of side arms 18 pivotally mounted intermediate their ends as at 19 on the side bars 12 of the rectangular frame, the forward ends of the arms 18 being connected by a cross bar 20 to which a sod strip severing blade 21 is secured. The forward ends of the side arms 18 that extend forwardly of the side bars 12 are connected by a cross rod 22, one end of which carries an angle extension to constitute a trip arm 23 that is engaged by an abutment roller 24 projecting inwardly and laterally of a spoke of the adjacent ground wheel 6. The sod strip severing blade 21 is normally retained in the elevated position shown by full lines in Figure 2 by means of coil springs 25 connecting the cross rod 22 to a cross brace 26 extending between the side bars 12 of the rectangular frame. When the machine is moved forwardly in its travel, the abutment roller 24 carried by one of the spokes of the ground wheel 6 moves into engagement with the trip arm 23 to raise the forward ends of the side arms 18 against the tension of the springs 25, the rear ends of the arms 18 being lowered and the blade 21 moved into severing engagement with the cut sod strip as shown in Figure 2 by dotted lines. When the roller 24 moves out of contact with the trip arm 23, the springs 25 raise the sod strip severing blade 21 to the full line position shown in Figure 2.

Devices are provided for rolling the cut sod strip and these devices are supported on a part of the frame structure extending rearwardly of the upright rectangular frame and which includes a pair of side bars 27 connected at their forward ends as at 27a to the side bars 12 while the rear ends of the bars 27 are supported by angular brace bars 28 connected to and extending between the rear ends of the bars 27 and the upper ends of the side bars 12. A rod 29 is journaled at its ends in the rear ends of the side bars 27, said rod 29 carrying a plurality of rearwardly arched rake tines 30 while a latch arm 31 is directed forwardly of each end of the rod 29 for engagement by latch devices supported on the bars 27. As shown in Figure 2, the sod strip 32 cut by the blade 14 is moved into rolled formation as shown at 32a by the tines 30 and when the side arms 18 of the sod strip severing device are lowered as shown by dotted lines in Figure 2, the latch devices on the side bars 27 are operated to release the latch arms 31 whereupon the weight of the sod roll 32 against the rake tines 30 causes the rod 29 to rotate in its bearings with the tines elevated and disengaged from the sod roll, the rake tines gravitationally lowering to their operative positions after the free ends thereof pass over the sod roll.

As shown more clearly in Figure 3, a stop lug 33 projects inwardly of each side bar 27 and is engaged by the adjacent latch arm 31 for limiting upward movement of the latter and downward movement of the rake tines 30. To hold the latch arms 31 against movement, there is provided a block 34 that is pivotally mounted as at 35 upon the inner side of each bar 27, one end of the block 34 being forked as at 36 to straddle the adjacent end of the latch arm 31 with the forked end 36 retained in engagement with the latch arm 31 by means of the leaf spring 37 interposed between the bar 27 and block 34. The pivot pin 35 of the block 34 is vertically disposed with the block movable in the horizontal plane and each block 34 carries an arcuate cam 38 that is adapted to be engaged by the adjacent side arm 18 of the sod strip severing frame during upward and downward movements thereof for disengaging the block from the latch arm 31.

From the above detailed description of the invention it is believed that the construction and operation will at once be apparent and while there is herein shown and described the preferred form thereof, it is to be understood that minor changes may be made, such as will fall within the scope of the invention as claimed.

I claim:

1. In a sod cutting machine of the character described, ground wheels and a main frame supported thereby, a sod-strip cutting blade carried by the frame, means carried by the rear end of the frame for moving the cut sod-strip into roll formation and means for severing the sod-strip into predetermined lengths, the sod-strip severing means including an auxiliary frame pivotally supported on the main frame and a severing blade carried by the auxiliary frame, resilient connections between the two frames for normally holding the severing blade in its elevated inoperative position and a cooperating means carried by a ground wheel and the auxiliary frame for lowering the severing blade into severing relation to a cut sod-strip.

2. In a sod cutting machine of the character described, ground wheels and a main frame supported thereby, the main frame including a normally perpendicular rectangular portion with the lower end constituting a sod-strip cutting blade, means carried by the rear end of the frame for moving the cut sod-strip into roll formation, means for severing the sod-strip into predetermined lengths and means adjustably mounted on the vertical side portions of the frame portions carrying the sod-strip cutting blade and associated with the sod-strip cutting blade for varying the thickness of the sod strip, the sod-strip severing means including an auxiliary frame pivotally supported on the main frame and a severing blade carried by the auxiliary frame, resilient connections between the two frames for normally holding the severing blade in its elevated inoperative position and a cooperating means carried by a ground wheel and the auxiliary frame for lowering the severing blade into severing relation to a cut sod-strip.

3. In a sod cutting machine of the character described, ground wheels and a main frame supported thereby, a sod-strip cutting blade carried by the frame, means carried by the rear end of the frame for moving the cut sod-strip into roll formation and means for severing the sod-strip into predetermined lengths, the sod-strip severing means including an auxiliary frame pivotally supported on the main frame and a severing blade carried by the auxiliary frame, resilient connections between the two frames for normally holding the severing blade in its elevated inoperative position and a cooperating means carried by a ground wheel and the auxiliary frame for lowering the severing blade into severing relation to a cut sod-strip, including an angle arm carried by the auxiliary frame and an abutment projecting laterally of the wheel adapted to be moved into engagement with the angle arm for moving the auxiliary frame.

4. In a sod cutting machine of the character described, ground wheels and a main frame supported thereby, the main frame including a normally perpendicular rectangular frame portion with the lower end constituting a sod-strip cutting blade, means carried by the rear end of the frame for moving the cut sod-strip into roll formation, means for severing the sod-strip into predetermined lengths and means adjustably mounted on the vertical side portions of the frame portion carrying the sod-strip cutting blade and associated with the sod-strip cutting blade for varying the thickness of the sod-strip, the sod-strip severing means including an auxiliary frame pivotally supported on the main frame and a severing blade carried by the auxiliary frame, resilient connections between the two frames for normally holding the severing blade in its elevated inoperative position and a cooperating means carried by a ground wheel and the auxiliary frame for lowering the severing blade into severing relation to a cut sod-strip, including an angle arm carried by the auxiliary frame and an abutment projecting laterally of the wheel adapted to be moved into engagement with the angle arm for moving the auxiliary frame.

5. In a sod cutting machine of the character described, ground wheels and a main frame supported thereby, a sod-strip cutting blade carried by the frame, means carried by the rear end of the frame for moving the cut sod-strip into roll formation and means for severing the sod-strip into predetermined lengths and the means for moving the sod-strip into roll formation including an arcuate rake having a series of tines pivotally supported on the main frame, and cooperating means carried by the rake and main frame for holding the rake in operative position and adapted to be released by the sod-strip severing means during movements of the latter.

6. In a sod cutting machine of the character described, ground wheels and a main frame supported thereby, the main frame including a normally perpendicular rectangular frame portion with the lower end constituting a sod-strip cutting blade, means carried by the rear end of the frame for moving the cut sod-strip into roll formation, means for severing the sod-strip into predetermined lengths and means adjustably mounted on the vertical side portions of the frame portions carrying the sod-strip cutting blade and associated with the sod-strip cutting blade for varying the thickness of the sod-strip and the means for moving the sod-strip into roll formation including an arcuate rake having a series of tines pivotally supported on the main frame, and cooperating means carried by the rake and main frame for holding the rake in operative position and adapted to be released by the sod-strip severing means during movements of the latter.

7. In a sod cutting machine of the character described, ground wheels and a main frame supported thereby, a sod-strip cutting blade carried by the frame, means carried by the rear end of the frame for moving the cut sod-strip into roll formation and means for severing the sod-strip into predetermined lengths, the sod-strip severing means including an auxiliary frame pivotally supported on the main frame and a severing blade carried by the auxiliary frame, resilient connections between the two frames for normally holding the severing blade in its elevated inoperative position and a cooperating means carried by a ground wheel and the auxiliary frame for lowering the severing blade into severing relation to a cut sod-strip and the means for moving the sod-strip into roll formation including an arcuate rake having a series of tines pivotally supported on the main frame, and cooperating means carried by the rake and main frame for holding the rake in operative position and adapted to be released by the sod-strip severing means during movements of the latter.

8. In a sod cutting machine of the character described, ground wheels and a main frame supported thereby, the main frame including a normally perpendicular rectangular frame portion with the lower end constituting a sod-strip cutting blade, means carried by the rear end of the frame for moving the cut sod-strip into roll formation, means for severing the sod-strip into predetermined lengths and means adjustably mounted on the vertical side portions of the frame portion carrying the sod-strip cutting blade and associated with the sod-strip cutting blade for varying the thickness of the sod-strip, the sod-strip severing means including an auxiliary frame pivotally supported on the main frame and a severing blade carried by the auxiliary frame, resilient connections between the two frames for normally holding the severing blade in its elevated inoperative position and a cooperating means carried by a ground wheel and the auxiliary frame for lowering the severing blade into severing relation to a cut sod-strip and the means for moving the sod strip into roll formation including an arcuate rake having a series of tines pivotally supported on the main frame, and cooperating means carried by the rake and main frame for holding the rake in operative position and adapted to be released by the sod-strip severing means during movements of the latter.

9. In a sod cutting machine of the character described, ground wheels and a main frame supported thereby, a sod-strip cutting blade carried by the frame, means carried by the rear end of the frame for moving the cut sod-strip into roll formation and means for severing the sod-strip into predetermined lengths, the sod-strip severing means including an auxiliary frame pivotally supported on the main frame and a severing blade carried by the auxiliary frame, resilient connections between the two frames for normally holding the severing blade in its elevated inoperative position and a cooperating means carried by a ground wheel and the auxiliary frame for lowering the severing blade into severing relation to a cut sod-strip, including an angle arm carried by the auxiliary frame and an abutment projecting laterally of the wheel adapted to be moved into engagement with the angle arm for moving the auxiliary frame and the means for moving the sod-strip into roll formation including an arcuate rake having a series of tines pivotally supported on the main frame, and cooperating means carried by the rake and main frame for holding the rake in operative position and adapted to be released by the sod-strip severing means during movements of the latter.

10. In a sod cutting machine of the character described, ground wheels and a main frame supported thereby, the main frame including a normally perpendicular rectangular frame portion with the lower end constituting a sod-strip cutting blade, means carried by the rear end of the frame for moving the cut sod-strip into roll formation, means for severing the sod-strip into predetermined lengths and means adjustably mounted on the vertical side portions of the frame portion carrying the sod-strip cutting blade and associated with the sod-strip cutting blade for varying the thickness of the sod-strip, the sod-strip severing means including an auxiliary frame pivotally supported on the main frame and a severing blade carried by the auxiliary frame, resilient connections between the two frames for normally holding the severing blade in its elevated inoperative position and a cooperating means carried by a ground wheel and the auxiliary frame for lowering the severing blade into severing relation to a cut sod-strip, including an angle arm carried by the auxiliary frame and an abutment projecting laterally of the wheel adapted to be moved into engagement with the angle arm for moving the auxiliary frame and the means for moving the sod-strip into roll formation including an arcuate rake having a series of tines pivotally supported on the main frame, and cooperating means carried by the rake and main frame for holding the rake in operative position and adapted to be released by the sod-strip severing means during movements of the latter.

ROE Q. KIRKPATRICK.